(12) United States Patent
Chen et al.

(10) Patent No.: US 9,894,159 B2
(45) Date of Patent: Feb. 13, 2018

(54) GENERATING CONSUMER INTERNET-OF-THINGS DATA PRODUCTS

(71) Applicant: Verizon Patent and Licensing Inc., Arlington, VA (US)

(72) Inventors: Ming Chen, Bedford, MA (US); Jianxiu Hao, Acton, MA (US); Zhong Chen, Acton, MA (US); Matthew J. Threefoot, Columbia, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 75 days.

(21) Appl. No.: 15/180,629

(22) Filed: Jun. 13, 2016

(65) Prior Publication Data

US 2017/0359417 A1 Dec. 14, 2017

(51) Int. Cl.
*H04W 68/00* (2009.01)
*H04L 29/08* (2006.01)
*H04W 60/04* (2009.01)
*H04W 4/00* (2009.01)

(52) U.S. Cl.
CPC ............ *H04L 67/12* (2013.01); *H04L 67/303* (2013.01); *H04W 4/005* (2013.01); *H04W 60/04* (2013.01)

(58) Field of Classification Search
CPC .......... H04W 72/042; H04W 72/0446; H04W 72/0413; H04W 4/005
See application file for complete search history.

(56) References Cited

U.S. PATENT DOCUMENTS

| 2016/0100350 A1* | 4/2016 | Laraqui | H04M 7/0012 370/328 |
| 2016/0374048 A1* | 12/2016 | Griot | H04W 68/005 |

* cited by examiner

*Primary Examiner* — Jamal Javaid

(57) ABSTRACT

A network device receives a definition for a data product of consumer Internet-of-Things (IoT) data and registers multiple machine-type communications (MTC)-devices for collection of consumer IoT data. The MTC devices provide the consumer IoT data with heterogeneous formats. The registering identifies a profile for each MTC device and particular data types authorized for collection. The network device receives consumer IoT data generated by the multiple MTC devices and extracts the particular data types from the IoT data. The network device normalizes the extracted data to include a uniform data format, and aggregates the normalized IOT data into clusters that exclude device identifiers. The network device constructs the clusters into a data portfolio that meets the definition for the data product.

20 Claims, 9 Drawing Sheets

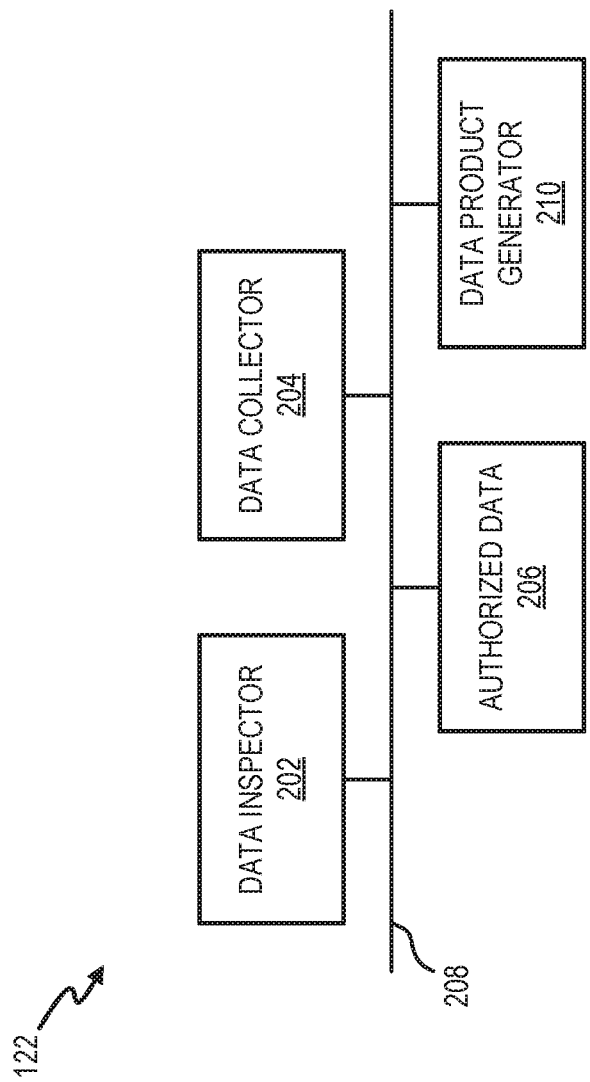

US 9,894,159 B2

GENERATING CONSUMER INTERNET-OF-THINGS DATA PRODUCTS

BACKGROUND

The Internet of Things (IoT) may be described as a network of physical objects or "things" embedded with various types of electronics, software, sensors, logic, circuitry, etc., that can collect and exchange data. A "thing" (referred to herein as an "IoT device" or, alternatively, a "machine-type communication (MTC) device") may connect to a service hosted on the Internet indirectly (e.g., via another network device, such as a coordinator, a gateway, etc.) or directly. Since IoT technology has nearly limitless applications that can be leveraged to form new and useful services, interest among service providers and developers in IoT technology continues to increase. In many instances, IoT data is useful to individual consumers for monitoring, alerts, historical trends, etc., related to individual devices. In other cases, IoT data can be used by the device makers or service entities associated with each IoT device for monitoring their products or services. However, cross-platform monetization of IoT data has been limited.

BRIEF DESCRIPTION OF THE DRAWINGS

FIG. 2A is a diagram of exemplary network elements of the data service platform of FIG. 1;

DETAILED DESCRIPTION OF THE PREFERRED EMBODIMENTS

Figure 1:
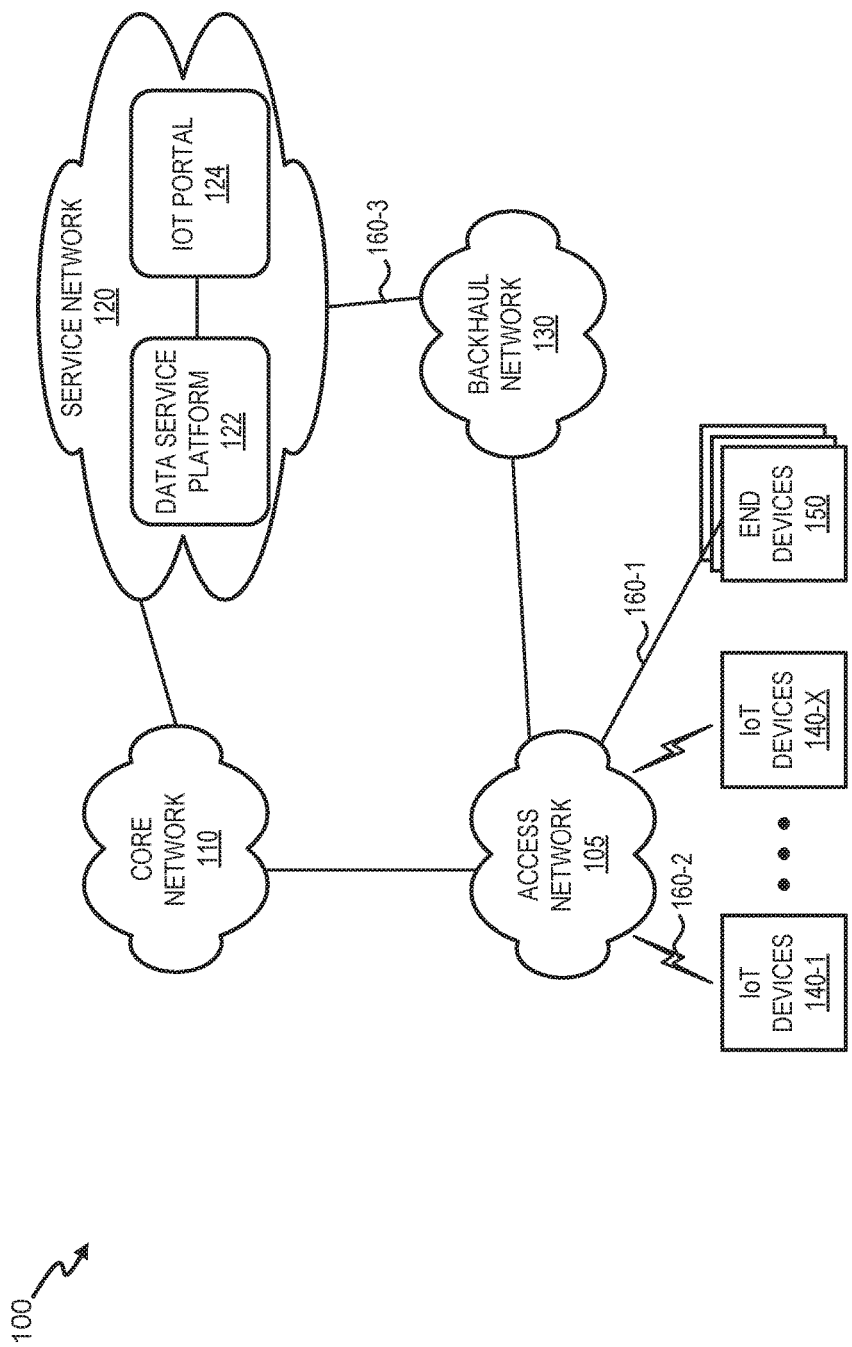
FIG. 1 is a diagram that depicts an exemplary network environment in which systems and methods described herein may be implemented.

The following detailed description refers to the accompanying drawings. The same reference numbers in different drawings may identify the same or similar elements.

The Internet-of-Things (IoT) environment provides massive amounts of data. Consumer IoT devices may collect and provide data related to a person's health, property, activity, and the like (referred to herein as IoT data). However, IoT data—and particularly consumer IoT data—is generally fragmented and disconnected from other IoT data. For example, a home lock manufacture selling an advanced lock will not only make the lock, but also a mobile application (or "app") and possibly a cloud platform to support lock features from the mobile app. IoT data related to a consumer's use of the lock may be provided to the lock manufacture and the mobile app. A competing lock manufacturer may provide a lock with a different mobile app and different cloud platform. IoT data related to a consumer's use of the competing lock may be provided to the competing lock manufacture and the different mobile app. Thus, IoT data for each manufacturer's own locks could be compiled. However, IoT data representing the larger home lock market (e.g., including IoT data from both lock manufacturers) would not be compiled without some agreement between the competing manufacturers.

A diverse array of consumer IoT data presents new possibilities for studies of particular data combinations, such as combinations of data from different IoT products, consumer behaviors, etc. However, data scientist, advertisers, marketing agencies, and the like may expend significant resources compiling data sets that allow for meaningful analysis. According to implementation herein, systems and methods may collect and aggregate consumer IoT data into particular combination products that are useful to third-party buyers. The systems and methods allow for generation of a portfolio of a diverse pool of data channels which, on an aggregated level, provides data anonymity, better resistance to noise, and semantics linkage among the data.

In one implementation, a network device in a service provider network may receive a definition for a data product that identifies criteria of interest to third parties (e.g., data scientist, advertisers, marketing agencies, etc.). Consumers (e.g., IoT device users) may register their IoT devices (also referred to herein as machine-type communications (MTC) devices) for collection of the consumer IoT data. The IoT devices may be associated with different manufactures and support platforms. Each registration recognizes a unique device identifier (such as an International Mobile Station Equipment Identity (IMEI), serial number, etc.) for each IoT device and particular data types the consumer authorizes for collection. The network device extracts, from network traffic, the particular data types from the IoT data generated by the registered IoT devices. The network device may then normalize the extracted particular data types to include a uniform data format for similar data fields and may aggregate the normalized IOT data into clusters. The clusters may include at least some of the normalized IoT data from the registered MTC devices and may exclude the unique device identifiers. The network device may construct the clusters into a data portfolio that meets the definition for the data product.

FIG. 1 is a diagram that depicts an exemplary network environment 100 in which systems and methods described herein may be implemented. As illustrated, environment 100 may include an access network 105, a core network 110, a service network 120, and a backhaul network 130. Service network 120 may have multiple network elements including, but not limited to, a data service platform 122 and an IoT portal 124. Environment 100 may also include IoT devices 140-1 through 140-X (also referred to as collectively as "IoT devices 140" and, individually or generically as "IoT device 140"), and end devices 150.

As further illustrated, environment 100 includes communicative links 160 between the network elements and networks (although only three are referenced in FIG. 1 as a links 160-1, 160-2, and 160-3). A network element may transmit and receive data via link 160. Environment 100 may be implemented to include wireless and/or wired (e.g., electrical, optical, etc.) links 160. A communicative connection between network elements may be direct or indirect. For example, an indirect communicative connection may involve an intermediary device or network element, and/or an intermediary network not illustrated in FIG. 1. Additionally, the number, the type (e.g., wired, wireless, etc.), and the arrangement of links 160 illustrated in environment 100 are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of networks, and the arrangement in environment 100 are exemplary. According to other embodiments, environment 100 may include additional network elements, fewer network elements, and/or differently arranged network elements, than those illustrated in FIG. 1. For example, there may be multiple data service platforms 122, IoT platforms 124, and so forth. Additionally, or alternatively, according to other embodiments, multiple network elements may be implemented on a single device, and conversely, a network element may be implemented on multiple devices. In other embodiments, one network in environment 100 may be combined with another network.

Access network 105 may include one or multiple networks of one or multiple types. For example, access network 105 may be implemented to include a terrestrial network, a satellite network, a wireless network, and/or a wired network. According to an exemplary implementation, access network 105 includes a radio access network (RAN). The RAN may be a Third Generation (3G) RAN, a Fourth Generation (4G) RAN, a 4.5G RAN, a future generation wireless network architecture, etc. By way of further example, access network 105 may include an Evolved UMTS Terrestrial Radio Access Network (E-UTRAN) of a Long Term Evolution (LTE) network or LTE-Advanced (LTE-A) network, a U-TRAN, Universal Mobile Telecommunications System (UMTS) RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, or the like. Depending on the implementation, access network 105 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. Access network 105 may include a wired network. For example, access network 105 may include an optical network or a cable network.

Core network 110 may include one or multiple networks of one or multiple types. For example, core network 110 may be implemented to include a terrestrial network, a satellite network, a wireless network, and/or a wired network. According to an exemplary implementation, core network 110 includes a complimentary network pertaining to the one or multiple RANs described above. For example, core network 110 may include the core part of an LTE network, an LTE-A network, etc. Depending on the implementation, core network 110 may include various network elements, such as a gateway, a support node, a serving node, a router, a switch, a bridge, as well other network elements pertaining to various network-related functions, such as billing, security, authentication and authorization, network polices, subscriber profiles, etc.

Service network 120 includes one or multiple networks of one or multiple types. For example, service network 120 may include the Internet, the World Wide Web, an Internet Protocol (IP) Multimedia Subsystem (IMS) network, a cloud network, a wide area network (WAN), a metropolitan area network (MAN), a service provider network, a private IP network, some other type of backend network, and so forth. As illustrated, according to an exemplary embodiment, service network 120 includes data service platform 122 and IoT portal 124. According to other exemplary embodiments, data service platform 122, IoT portal 124, and/or a portion thereof may be implemented in core network 110.

Data service platform 122 includes a network device that provides advanced network services in addition to traditional services, such as Transport Control Protocol (TCP) optimization, traffic shaping, and traffic statistic collections. Additionally, data service platform 122 provides an IoT data service. The IoT data service includes receiving all packets that are transmitted by IoT devices 140. Upon receipt of the packets, the IoT data service inspects each packet, identifies data that is authorized (e.g., by consumers that have registered and opted in) to be collected. The IoT data service provides data normalization, aggregates the IoT data with other IoT data, and may link the IoT data to other data to generate a data product for specific criteria. The data product is made available to potential customers using, for example, end devices 150 accessing IoT portal 124. Data service platform 122 is described further in connection with FIG. 2A below.

Still referring to FIG. 1, according to an exemplary embodiment, IoT portal 124 includes a network device that provides IoT management services. Users of the IoT application framework may manage (e.g., configure, issue commands, update, monitor, etc.) IoT devices 140 and other network elements (e.g., IoT data, linked data, aggregated data, etc.) via end device 150. IoT portal 124 may provide various IoT management services such that a user may manage on-the-fly and/or remotely. Additionally, IoT portal 124 may allow users to manage in an automated manner based on a management schedule. For example, a user may configure a time schedule during which IoT configuration data (e.g., a software update) pertaining to multiple IoT devices 140 is updated.

According to an implementation, IoT portal 124 may include a network device that provides an IoT software application development service. The IoT software application development service provides access to and use of APIs that may be used to develop a software application. The software application may use an API to hook into the linked data (of data sources 220) or authorized data 206 so as to provide a service afforded by the software application. The IoT software application development service also provides software development kits (SDKs) that assist users to develop the software application for various end devices 150. Additionally, the IoT software application development service also provides a sample software application that illustrates how the APIs work, which may assist users during the development stage. IoT portal 124 is described further in connection with FIG. 2C below.

As further shown in FIG. 1, backhaul network 130 includes one or multiple networks of one or multiple types. According to an exemplary implementation, backhaul network 130 includes a backbone network. For example, the backbone network may be implemented as an optical transport network or other suitable architecture. According to an exemplary implementation, backhaul network 130 provides a connection path to service network 120. For example, IoT device 140 may transmit IoT data to data service platform 122 via access network 105 and backhaul network 130 using a NAS control channel. According to an exemplary implementation, when access network 105 is implemented as an LTE RAN or an LTE-A RAN, backhaul network 130 may directly connect to an eNB. According to such an architecture, the IoT data transmitted using the NAS control channel may not traverse network elements of a complimentary part of core network 110.

According to an exemplary embodiment, IoT device 140 includes logic to collect, obtain, and/or generate IoT data as a part of an IoT device service. For example, IoT device 140 may be implemented to include various technologies, such as a sensor, a tag, a camera, an antenna, etc., that collects, obtains, and/or generates IoT data. According to various implementations, IoT device 140 may be a stationary device or a mobile device (e.g., an IoT device 140 attached to a drone, a mobile IoT device, an IoT device embedded or attached to a living organism (e.g., an animal or a person), etc.). IoT device 140 may include a component (e.g., a Global Positioning System (GPS) chipset, etc.) that provides location-aware functionality. IoT device 140 may be powered by an internal source, an external source, a battery, an outlet, electromagnetic waves, and so forth.

According to an exemplary embodiment, IoT device 140 includes a communication interface via which IoT device 140 can transmit and receive data. According to an exemplary embodiment, the communication interface includes an LTE and/or an LTE-A modem (referred to herein as "LTE modem"). The LTE modem transmits and receives data using an LTE NAS control channel as a part of the IoT device service and the IoT data service. According to an exemplary implementation, the LTE NAS control channel can be used to transport small payloads (e.g., 256 bytes or less). For example, IoT device 140 may transmit IoT data to data service platform 122 as a part of an IoT data service and receive data from IoT portal 124 as a part of an IoT management service. According to another implementation, IoT device 140 may transmit IoT data to data service platform 122 via backhaul network 130.

According to other embodiments, the communication interface of IoT device 140 includes a modem other than the LTE modem and IoT device 140 transmits and receives data using conventional or well-known communication technologies other than the LTE NAS control channel. Thus, IoT device 140 may communicate with service network 120 via access network 105, core network 110, and/or backhaul network 130 via the communication interface. IoT device 140 may also communicate with local devices (not illustrated) using various short-range communication technologies. For example, IoT device 140 may obtain IoT data from a sensor as a part of the IoT device service.

According to an exemplary embodiment, IoT device 140 includes logic that supports the IoT services. For example, IoT device 140 includes logic to interpret and execute a command via an API call, which is received via the communication interface. IoT device 140 may also include logic that allows for identifying an API when performing the function or operation of the API call. According to implementations described herein, each IoT device 140 may be registered with service network 120. Registration may indicate the IoT device owner, IoT device ID, IoT device certificate, and IoT device IP address. The registered IoT devices 140 may also be passed through an onboarding process, which makes sure each IoT device has the necessary software (firmware) loaded for security and best practice to maximize network performance.

End device 150 may include a communicative and computational device. End device 150 may be implemented as a mobile device, a portable device, or a stationary device. For example, end device 150 may be implemented as a smartphone, a tablet, a phablet, a netbook, a computer (e.g., a laptop, a desktop, a palmtop, etc.), a personal digital assistant, a terminal, and so forth. According to an exemplary embodiment, end device 150 provides users access to IoT portal 124. For example, end device 150 includes a client, such as a web browser or other suitable software application. Users may be considered an operator of end device 150. For example, a user may be a network administrator, a third party (e.g., a vendor, a merchant, a potential customer), and so forth.

Link 160 provides a communication path between network elements and/or networks of environment 100. Link 160 may have certain characteristics, such as bandwidth capacity, transmission data rate, and the like.

FIG. 2A is a diagram of exemplary network elements of data service platform 122. As illustrated in FIG. 2A, data service platform 122 may include a data inspector 202, a data collector 204, authorized data 206, and a data product generator 210. According to other exemplary embodiments, data service platform 122 may include additional, fewer, and/or different network elements than those illustrated in FIG. 2A and described herein. Data inspector 202, data collector 204, authorized data 206, and/or data product generator 210 may be connected to and communicate with each other via a hardware link (e.g., a data bus, a system bus, a control bus), a software link (e.g., an application program interface (API), inter-process communication (IPC), etc.) or an inter-network device link (e.g., link 160) via a link 208.

According to an exemplary embodiment, data inspector 202 includes logic that identifies packets, such as packets carrying IoT data. Data inspector 202 may collect IoT data from consumers that have opted in to provide IoT data. For example, data inspector 202 may identify data from IoT devices 140 that have been previously registered and opted in to permit IoT data collection. In one implementation, data inspector 202 may receive IoT data forwarded directly from IoT devices 140. In another implementation, data inspector 202 may receive authorized collections of IoT data from an end device 150 in communication with IoT device 140. Data inspector 202 may filter data and reject data packets or individual data fields within packets that have not been previously authorized.

According to another implementation, data inspector 202 uses a packet inspection method. For example, data inspector 202 may perform deep packet inspection. As a result of the packet inspection, data inspector 202 obtains network protocol data (e.g., source Internet Protocol (IP) address, destination IP address) and, other header data (e.g., size of datagram, etc.), payload data (e.g., IoT data), a device identifier of IoT device 130, etc. Depending on the protocol stack used by IoT device 140 to transmit the IoT data, data inspector 202 may identify various types of data.

According to one exemplary implementation, when IoT device 140 is assigned a static IP address, data inspector 202 determines that the packet pertains to a particular IoT device 140 based on the static IP address. For example, in an LTE network or an LTE-A network, data service platform 122 may interface with various network elements of core network 110 (e.g., a home subscriber server (HSS), a packet data network gateway (PGW), a mobility management entity (MME), etc.). According to an implementation, the HSS stores a subscriber profile pertaining to IoT device 140. The subscriber profile may include a static IP address, as well as other subscription data (e.g., a device identifier, etc.). By way of further example, in view of the address space afforded by IPv6, IoT device 140 may be assigned a static IPv6 address. Based on the subscriber profile, data inspector 202 may identify a packet pertaining to the particular IoT device 140. According to another implementation, data service platform 122 may locally store a database. The database may store subscriber profiles that include static IP addresses assigned to IoT devices 140 and other subscription data. In another implementation, the database may store real-time TCP session data for registered devices using data service platform 122.

According to other implementations, when dynamic allocation of an IP address is used, the PGW may allocate an IP address to IoT device 140 based on an IP pool or through another device (e.g., Dynamic Host Configuration Protocol (DHCP) server, etc.). Data inspector 202 may acquire (e.g., via communication with the PGW and/or the DHCP server) the dynamically allocated IP address assigned to IoT device 140 and a device identifier of IoT device 140. Based on this information, data inspector 202 may identify a packet pertaining to the particular IoT device 140.

According to various implementations, IP address assignment relative to IoT device 140 may occur during initial attachment to access network 105 and core network 110 or subsequently in accordance with a communication standard (e.g., a 3GPP LTE standard, etc.). IoT device 140 may transmit an attachment request, which includes a device identifier pertaining to IoT device 140. IoT device 140 may be assigned an IPv6 address or an IPv4 address. Subsequent to assignment of the IP address, data inspector 202 of data service platform 122 may identify packets that pertain to a particular IoT device 140.

According to yet another exemplary implementation, data inspector 202 includes logic to identify IP addresses that are within a certain range that have been allocated to IoT devices 140.

According still other exemplary implementations, data inspector 202 includes logic to identify packets carrying IoT data based on a device identifier of IoT device 140. For example, IoT device 140 may use an IoT modem of IoT device 140 to transmit the packet via a non-access stratum (NAS) control channel. The packet may carry a device identifier of IoT device 140. The device identifier may be stored in the subscriber profile as subscription data. Data inspector 202 may identify a packet pertaining to a particular IoT device 140 based on the device identifier.

Upon the identification of a packet as one carrying IoT data, data inspector 202 may further differentiate packets (or particular data fields within packets) that are authorized by consumers for collection and those that are not authorized for collection. For example, if a subscriber profile indicates all IoT packets from a particular IoT device 140 are authorized for collection, data inspector 202 may collect all data packets from the particular IoT device 140.

As another example, if a subscriber profile indicates only certain types of IoT packets from an IoT device 140 are authorized for collection, data inspector 202 may identify data based on an API identifier included in the IoT packet. The API identifier may include a unique identifier that indicates, for example, a particular API. As described further herein, each API offered in service network 120 may correspond to a certain type of IoT device 140 and/or a corresponding type of IoT data. Thus, a unique API identifier may be included in packets responsive to an API call and data inspector 202 may match the unique API to a corresponding data type that a consumer has authorized for collection.

Data collector 204 includes logic to collect and store IoT data that is authorized for collection (e.g., as detected by data inspector 202). Data collector 204 stores authorized data 206 in a repository (e.g., a database, a data structure, etc.). As described further herein, authorized data 206 is made available for use by data product generator 210 to create data products. For example, in one implementation, data collector 204 may store authorized data 206 in a dedicated memory that is accessible to data product generator 210, but may not be accessible to unauthorized platforms or APIs available for third-party use.

Data product generator 210 includes logic to receive collected IoT data from authorized data 206 and generate data products that can be offered for sale to potential customers. Data product generator 210 may perform data normalization, aggregate IoT data with other IoT data, and link the IoT data to other data to generate a data product that meets specific customer criteria. In one implementation, data product generator 210 may generate a description of the data product and make the data product available to potential customers. Data product generator 210 is described further in connection with FIG. 4 below.

Figure 2B:
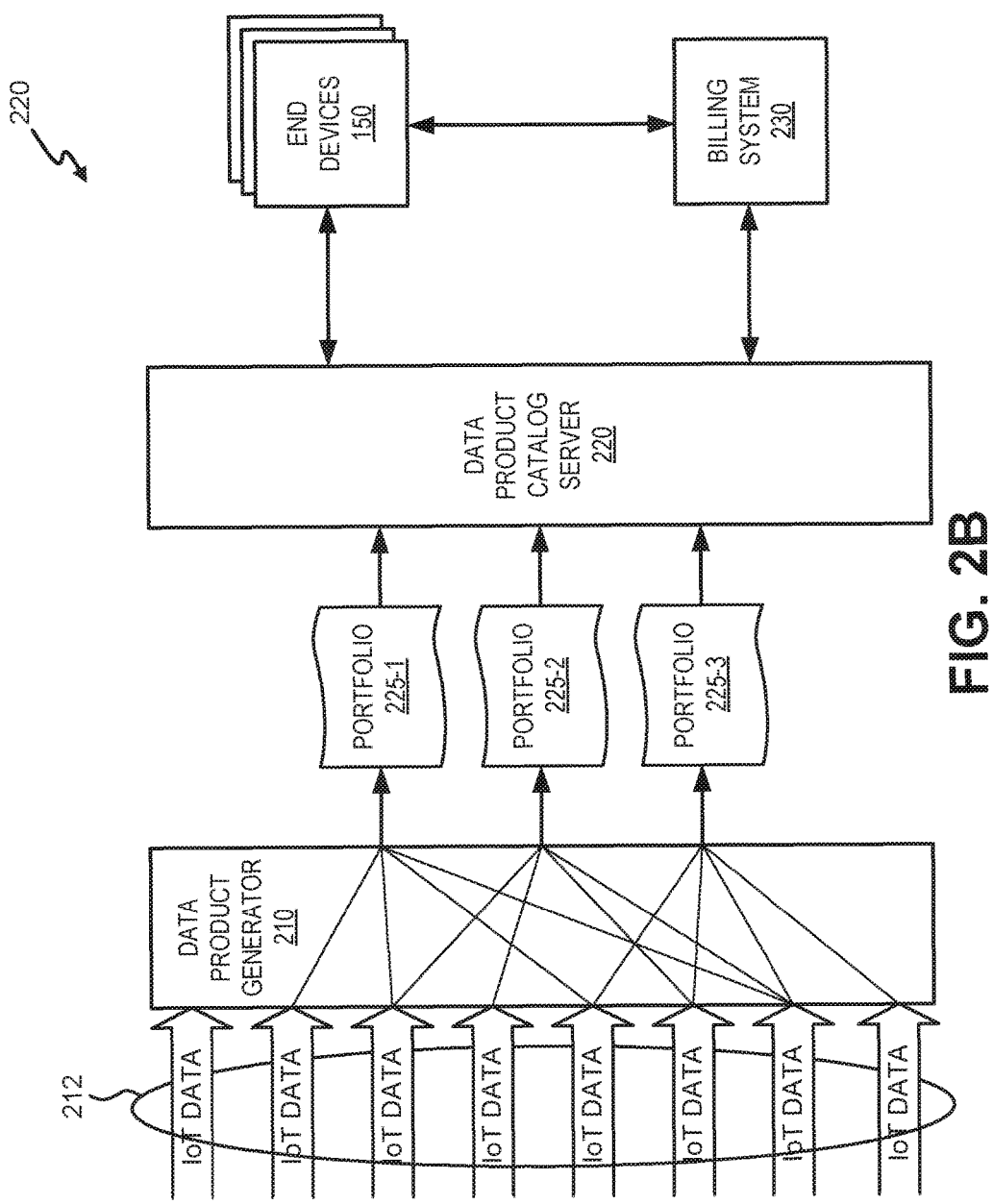
FIG. 2B is a diagram that illustrates an exemplary implementation of the data product generator within a network environment 220.

FIG. 2B is a diagram that illustrates an exemplary implementation of data product generator 210 within a network environment 220. Network environment 220 may include data product generator 210 in communication with a data product catalog server 230, a billing system 230, and end devices 150.

As shown in FIG. 2B, IoT data 212 from authorized data 206 may be provided to data product generator 210. According to an implementation, consumers with registered IoT devices 140 can opt in to share the usage of some or all of the data streams generated by IoT device 140 from daily activity or a special event. The IoT data 212 that the consumer is willing to share could be, as an example, a dweet™ channel of GPS sensors to record his/her daily routines, or wearable sensor data during a workout. Consumers who share their IoT data 212 can be rewarded by a profit or revenue sharing mechanism, such as a credit to a subscriber's account. The exact amount of profit/revenue sharing a customer receives can, in one implementation, be calculated based on the overall price of a portfolio 225, as well as the consumer's share in the grouped data product. The pricing mechanism of a portfolio 225 will be affected by the potential returns (data discovery and insight) and the inherent noise. "Noise" may include, for example, errors and irrelevant information induced by insufficient data. The role of noise in a data product (i.e., portfolio 225) may be considered a risk factor for the end user which may influence pricing for a particular data portfolio 225. In one implementation, the data producer (e.g., IoT device 140 and/or its user) can be encouraged with additional incentives (e.g., higher account credits, access to premium features, etc.) to provide explicit help to improve data accuracy. Such improvements can be achieved, for example, by tagging data or explicitly confirming some discovery generated from machine learning. This explicit do-it-yourself data processing may improve data accuracy compared to other implicit methods.

Data product generator 210 may receive collected IoT data 212 and apply input from buyers to generate data portfolios 225 that can be offered for sale. Data product generator 210 may apply, for example, a data policy statement to IoT data 212 to be able to accommodate heterogeneous data sources for IoT data 212. Heterogeneous data sources may include, for example, IoT data 212 in different orders and formats, such as data from similar IoT devices 140 made by different vendors/original equipment manufacturers or data compilations from different types of software applications (e.g., on end devices 150). In other implementations, heterogeneous data may include IoT data 212 from completely different types of IoT devices 140. Data product generator 210 is described further in connection with FIG. 4.

Each portfolio 225 may include a data product formulated by data product generator 210 for a particular market or for particular specifications. For example, portfolio 225 may reflect needs of potential customers, such as data scientists, campaign managers, advertising executives, and the like for a particular market. The particular specifications may be directly communicated from a potential customer to the service provider (e.g., by a work order, request for proposal, etc.), inferred from market analysis, or developed as a collaborative effort (e.g., consortiums, etc.). Each portfolio 225 may include combinations of different channels (or sources) of IoT data 212 and each source may be used for more than one portfolio 225.

Exchange server 220 may include a computing device or network device to receive descriptions of portfolios 225 and offers from end devices 150. Exchange server 220 may identify portfolios 225 that are available to potential customers and provide portfolio descriptions along with contextual data. Contextual data may include, for example, time-based and location-based information that may influence a potential customer's propensity to value a portfolio. In one implementation, potential customers may use end devices 150 to register (e.g., create an account) with exchange sever 220 to access the portfolio descriptions and initiate a purchase. Assuming a potential customer selects to purchase a portfolio, exchange server 220 may receive an indication of the potential customer's selection/offer from end device 150 to initiate processing, payment, or billing associated with the offer.

Billing system 230 may include one or more network devices, or other types of computation or communication devices, to manage charging customer for services provided via services network 120. Billing system 230 may also manage revenue calculations for IoT data providers (i.e., consumers) based on sales of portfolios 225. As described further herein, billing system 230 may include, for example, an account billing module and/or a revenue distribution module. Billing system 230 may initiate credit card checks (e.g., for potential customers), assign charges to customer accounts, and/or process payments for purchases with services network 120. For consumers, billing system 230 may also provide account credits, issue electronic payments, or provide other compensation for opting in to provide IoT data.

End device 150 may be implemented as a smartphone, a computer, and so forth. The potential customer may be an operator of end device 150. In one implementation, end device 150 may include an application specifically configured to conduct transactions for portfolios 225. For example, a potential customer may register end device 150 with data product catalog server 220 and download an application to enable bids, purchases, and/or feedback for portfolios 225.

The number and arrangement of devices illustrated in FIG. 2B is provided for illustrative purposes. In practice, there may be additional devices, fewer devices, differ devices, or differently arranged devices than those illustrated in FIG. 2B.

Figure 2C:
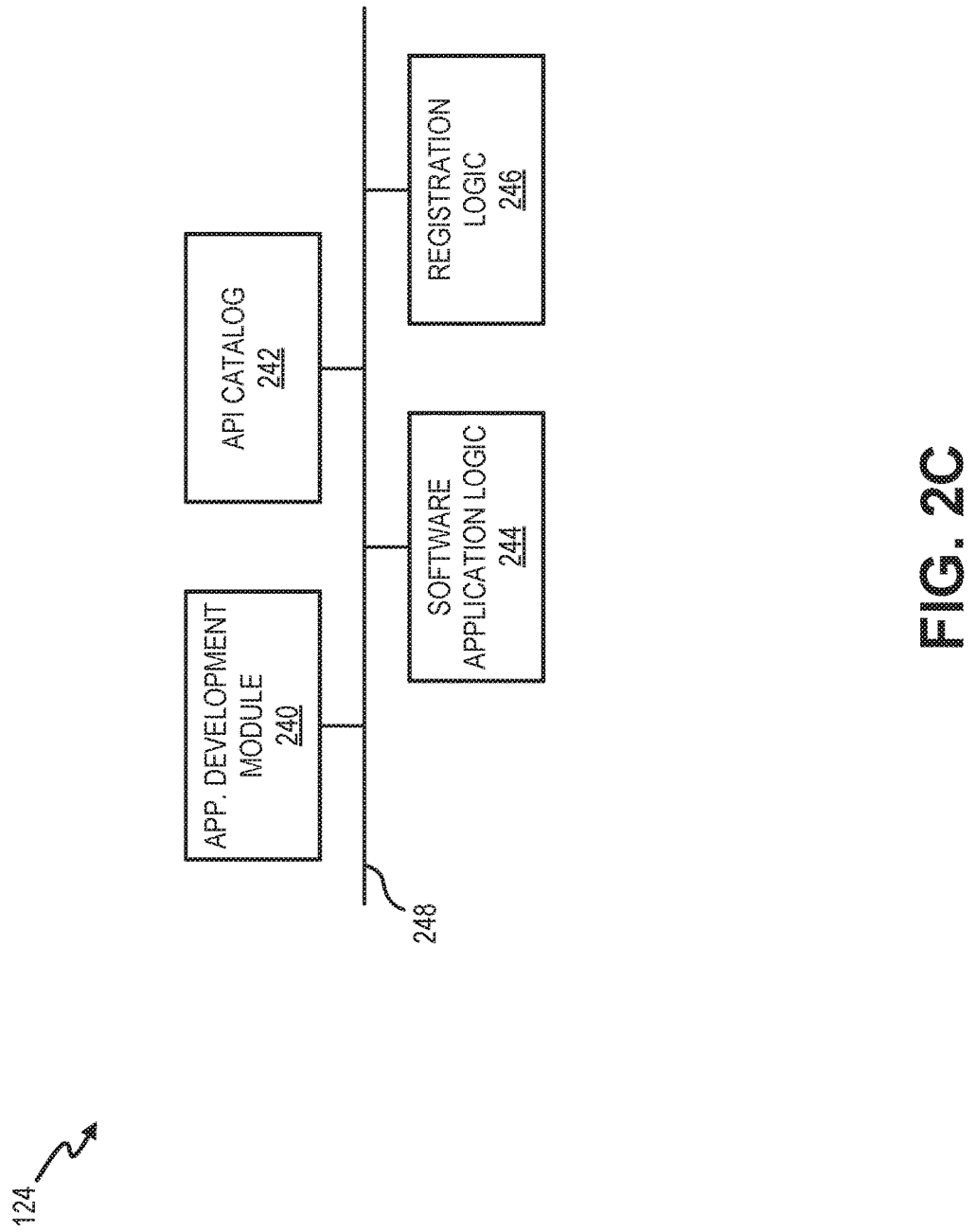
FIG. 2C is a diagram of exemplary network elements of the IoT portal of FIG. 1.

FIG. 2C is a diagram illustrating exemplary network elements of IoT portal 124. For example, as illustrated, IoT portal 124 may include application development module 240, API catalog 242, and software application logic 244. According to other exemplary embodiments, IoT portal 124 may include additional, fewer, and/or different network elements than those illustrated in FIG. 2C and described herein. For example, IoT portal 124 may include authentication logic, data linking logic, scheduling logic, and other network elements to permit execution of software applications on end devices 150. Application development module 240, API catalog 242, and software application logic 244 may be connected to and communicate with each other via a hardware link (e.g., a data bus, a system bus, a control bus), a software link (e.g., an API, IPC, etc.) or an inter-network device link (e.g., link 160) via a link 248. Each of application development module 240 and software application logic 244 may provide a graphical user interface that allows a subscriber(e.g., a user of end device 150) to use the various services and perform various tasks as described herein.

According to an exemplary embodiment, application development module 240 includes logic that provides an IoT software application development service. For example, the IoT software application development service provides users (e.g., of end device 150) access to API catalog 242. The APIs in API catalog 242 may be used by users to develop a software application, such as a software application that makes use of IoT data. APT catalog 242 may be included, for example, within a database or other storage that can be cross-referenced using application development module 240. Given the array of various IoT devices 140 available and corresponding IoT data to be obtained, the catalog of APIs may be proportionally large. For example, IoT devices 140 may include cameras to capture images in public places, video cameras to capture video and audio in public places, location chips to collect location data pertaining to vehicles (e.g., cars, busses, subways, trains, etc.), mobile phones to collect location data pertaining to the mobile phones and/or the end users, health and fitness devices to collect health monitoring data, and so forth. According to implementations described herein, each API in the catalog of APIs may include a unique API identifier, which may be used, for example, IoT devices 140 respond to API calls and initiate IoT data transfers.

According to an exemplary embodiment, the APIs provide access to and use of IoT data, the linked data, and/or the aggregated data. The APIs may also specify certain operations to be performed in order to use a service and/or data offered by the data service platform 122. For example, an API may define and require a permission before providing access to data pertaining to an IoT device 140, an end device 150 associated with an end user, and so forth.

According to an exemplary embodiment, application development module 240 provides SDKs that assist users to develop a software application. The SDKs include a set of development tools including, for example, a debugger, software libraries, APIs, documentation, sample code, tutorials, and so forth. The SDKs may provide these tools in an integrated development environment (IDE). The SDKs may allow users to create software applications directed to various operating systems (e.g., Android, iOS, etc.). The software application may be a server-side software application and/or an end user-side software application. The SDKs provide access to and use of the services offered by data service platform 122 and the IoT data, the linked data, and/or the aggregated data.

Software application logic 244 may include logic that provides a management service pertaining to the software application. For example, software application logic 244 allows users to manage the software application, such as on-boarding an update to the software application, providing an over-the-air update service for updating the software application to end devices 150, and so forth.

Registration logic 246 may register users and/or IoT devices 140 for access to IoT data services (e.g., services to retrieve, process, and package IoT data for sale) from services network 120. For example, registration logic 246 may provide a user interface (e.g., a web-based interface) to enable a user of IoT devices 140 to associate a user account with particular IoT devices. Registration logic 246 may, for example, solicit user credentials (e.g., a client ID and password) for a user's wireless or home network account. Upon receipt of the user credentials, registration logic 246 may solicit details for a profile of the IoT device 140. The profile may include indications of particular data types that a consumer's IoT device 140 will provide and may associate the particular data types with a unique identifier for the IoT device 140. When the profile is completed, registration logic 246 may then activate data collection, for the particular IoT device 140 and selected data fields, by data inspector 202.

In another implementation, registration logic 246 may register new apps for IoT devices 140. For example, an OEM may develop a new app that implements APIs from API catalog 242. The APIs, when implemented, may provide an indication to data inspector 202 of what type of data an IoT device 140 will provide to service network 120. Thus, data inspector 202 may use registration information to cross-reference unique API identifiers to particular data fields.

In still another implementation, registration logic 246 may provide a user interface to register potential customers. For example, potential customers, via end devices 150, may register to be permitted to submit combinations of IoT data groupings that may be used in data set descriptors 405, and eventually used to generate data products.

Figure 3:
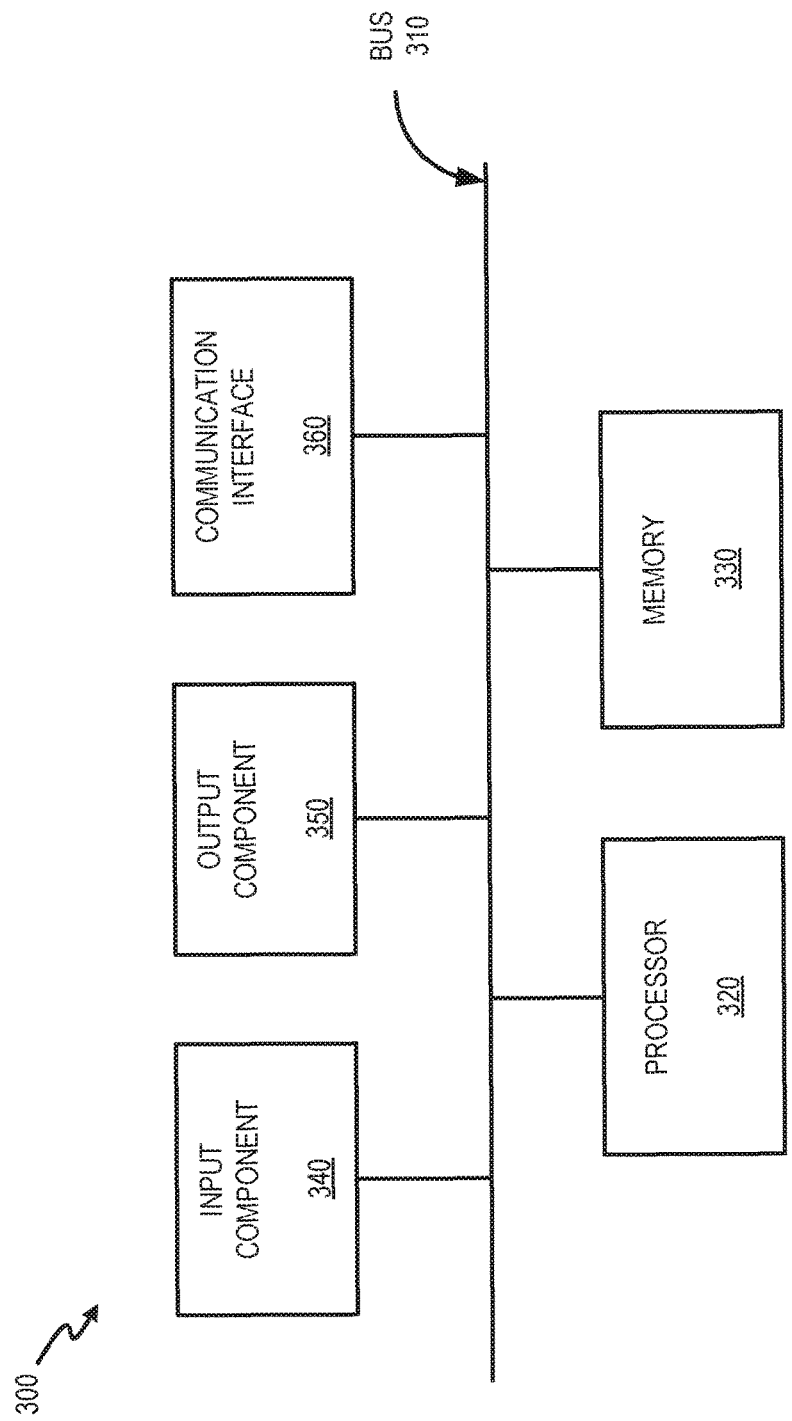
FIG. 3 is a diagram of exemplary components that may be included in one or more of the devices shown in FIGS. 1, 2A, 2B, and 2C.

FIG. 3 is a diagram illustrating exemplary components of a device 300. Device 300 may correspond, for example, to IoT device 140, end device 150, data service platform 122, IoT portal 124, data inspector 202, data collector 204, data product generator 210, data product catalog server 220, billing system 230, application development module 240, a component of access network 105, a component of core network 115, or a component of backhaul network 130.

Device 300 may include a bus 310, a processor 320, a memory 330, an input component 340, an output component 350, and a communication interface 360. Although FIG. 3 shows exemplary components of device 300, in other implementations, device 300 may contain fewer components, additional components, different components, or differently arranged components than those depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320. Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of radio frequency (RF) signals. For example, communication interface 360 may include one or more antennas to transmit and/or receive RF signals over the air. Communication interface 360 may, for example, receive RF signals and transmit them over the air to IoT device 140, and receive RF signals over the air from IoT device 140. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions contained in a computer-readable medium, such as memory 330. A computer-readable medium may be defined as a non-transitory memory device. A non-transitory memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. As an example, in some implementations, a display may not be included in device 300. In these situations, device 300 may be a "headless" device that does not include input component 340. Additionally, or alternatively, one or more operations described as being performed by a particular component of device 300 may be performed by one or more other components, in addition to or instead of the particular component of device 300.

Figure 4:
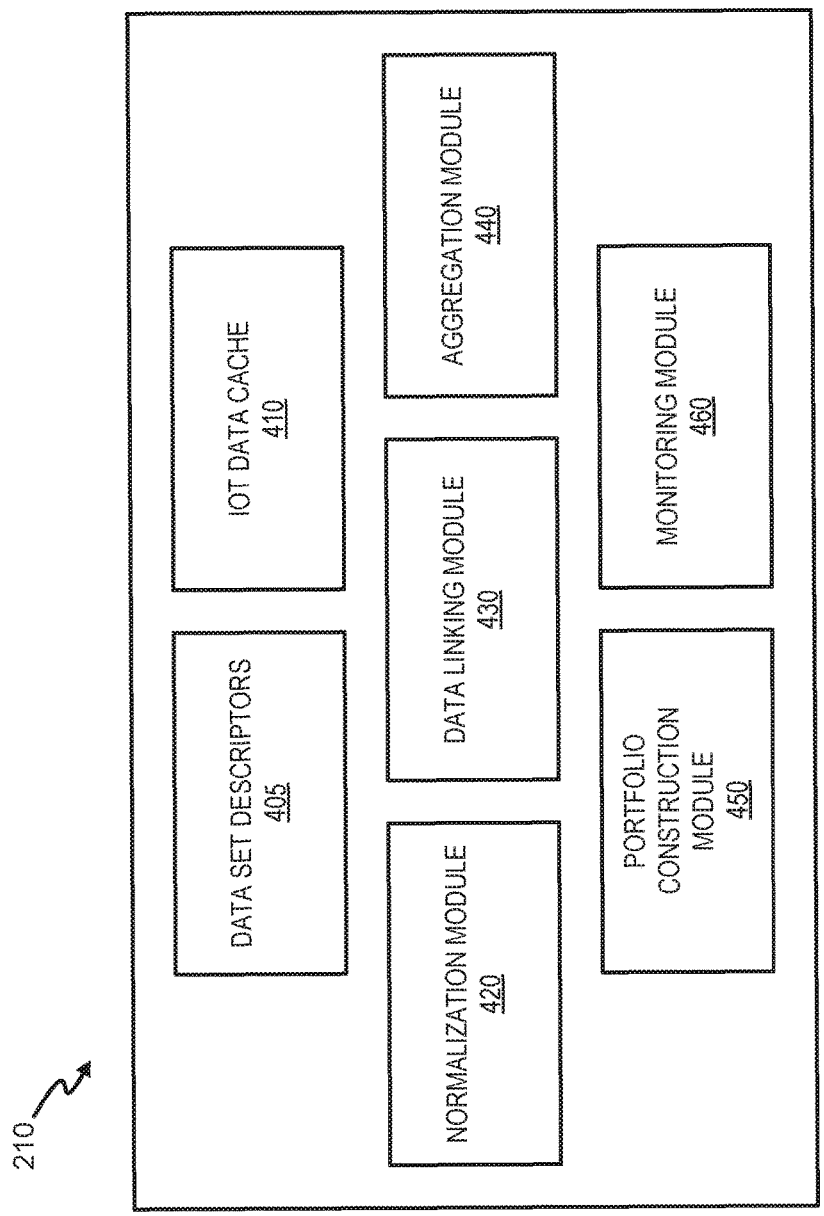
FIG. 4 is a diagram showing modules of the data product generator of FIG. 2A.

FIG. 4 is an example of modules that may be included in data product generator 210. In one implementation, the function of modules described in connection with FIG. 4 may be implemented by one or more components of device 300 (FIG. 3). As shown in FIG. 4, data product generator 210 may include data set descriptors 405, an IoT data cache 410, a normalization module 420, a data linking module 430, an aggregation module 440, a portfolio construction module 450, and a monitoring module 460.

Data set descriptors 405 may include a memory or another storage device. Data set descriptors 405 may include input derived from customers of IoT data to define what type and groupings of IoT data may be valued. For example, a data product that includes individual fitness data may be of interest to some customers, while another data product that includes home automation information may be of interest to different customers. Other potential customers may prefer unique combinations of information that would typically not otherwise be associated (e.g., volumes for entertainment devices and indoor temperatures). Data set descriptors 405 may be compiled from marketing surveys, customer solicitation, data analytics, etc. In one implementation, data set descriptors 405 may include particular field names from IoT data packets or normalized field names for data generated by IoT devices 140.

In one implementation, data set descriptors 405 may include an initial incentive valuation for particular data types. The incentive valuation represents a value that may be credited to an IoT device user's account to encourage participation in an IoT data collection. The incentive valuation may include, for example, a revenue percentage from particular data products, a flat rate, or a credit amount per a particular volume of data. For example, the initial incentive valuation may represent a monetary value (e.g., a consumer compensation value) that a user of IoT device 140 would receive for contributing particular data. The incentive valuation may be set based on the expected value of data products to which the consumer's IoT data would contribute. Additionally, or alternatively, the incentive valuation may be based on actual data product sales amounts and the demand for IoT data. Consumer compensation may be provided in the form of account credits, electronic payments, or other compensation. In some instances, consumer compensation may also take the form of non-monetary values, such as incremental amounts of wireless data credits or free access to premium services.

IoT data cache 410 may include a memory or storage device to hold IoT data, retrieved from authorized data 206, in various intermediate forms. In one implementation, IoT data cache 410 may include multiple copies of IoT data and or data compilations, such as normalized data, linked data, and/or aggregated data from other modules of data product generator 210. IoT data cache 410 may also include tags or other metadata associated with the IoT data.

Normalization module 420 obtains data from authorized data 206 or IoT data cache 410 and performs initial steps to generate a data product that is viable for dissemination to customers. As data formats in authorized data 206 or IoT data cache 410 may vary depending on data sources, normalization module 420 may translate various data formats into unified syntax for further use by, for example, data linking module 430 and aggregation module 440. In one implementation, normalization module 420 may include a table or another data structure to cross-reference similar data fields used by different types of IoT devices 140 and/or applications on receiver devices 120. The table may be updated to reflect new data formats at the time of IoT device 140 registrations or partner registrations with services network 120 (e.g., via registration logic 246).

Data linking module 430 obtains data from IoT data cache 410 or normalization module 420 and applies data semantics to provide context. For example, data linking module 430 may apply data semantics to associate data with a particular real-world context or meaning. By linking the data and mapping to the meaning, data linking module 430 can effectively help to determine how a data product represents a concept or object in the real word. For example, semantics links may associate a data cluster with a particular activity, a type of IoT device, an event, a location, or another data cluster.

According to an exemplary embodiment, data linking module 430 includes logic to select a type of linked data to obtain based on the data identified and/or provided by normalization module 420. For example, the identified and/or provided data may include a source network address, a device identifier, and/or IoT data. As used herein, linked data is intended to mean any data that supplements or augments the IoT data. The linked data may include various types of data. For example, the linked data may include timestamp data (e.g., time or date and time) pertaining to when the IoT data was transmitted by IoT device 140 and/or when the IoT data was received by data service platform 122, location data of IoT device 140 (e.g., longitude and latitude, a name of a place, a street address, city, state, zip code), an IoT device 140 that is a neighbor or a part of a group of IoT devices 140 to which the transmitting IoT device 140 belongs, and/or other metadata, such as environmental data (e.g., weather, etc.) or contextual data (time, locale, events, etc., pertaining to IoT device 140/IoT data.

Aggregation module 440 obtains data from IoT data cache 410 or normalization module 420 and groups the data so that individual identity will be hidden. Consumer concerns about data privacy may be a barrier to widespread sharing of IoT data, especially since some IoT devices 140 can track much more personal information than is typically collected through a web browser or smart phone. For example, a wearable IoT device 140 can track a person's every movement. According to implementations herein, aggregation module 440 mixes a relatively large number of data channels into a pool, making it nearly impossible to tell the identity of individual data producers. In one implementation, aggregation module 440 will detect input from at a least a predetermined number of different IoT devices 140 before releasing data to portfolio construction module 450 or another module.

Figure 5:
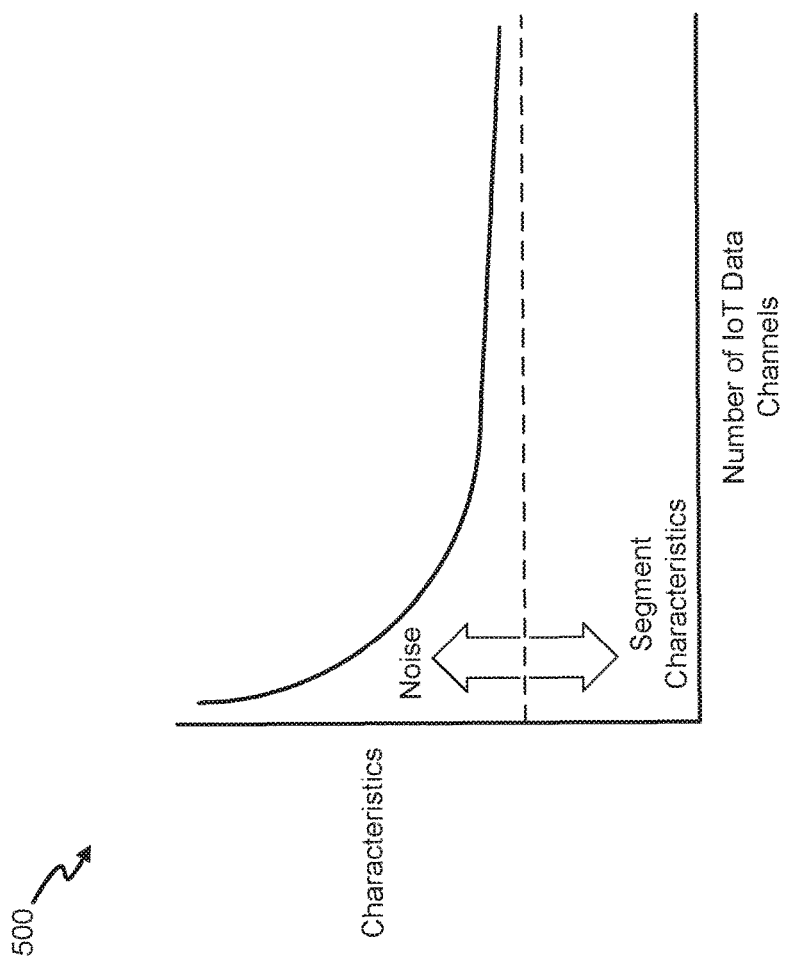
FIG. 5 is a sample graph illustrating noise levels for a data portfolio of FIG. 2B.

Aggregation module 440 also filters out the noise of individual data to identify true segment characteristics. For example, FIG. 5 provides a graph 500 illustrating noise levels for a particular data portfolio 225. As illustrated in FIG. 5, for a particular data portfolio 225, as the number of IoT data channels (or sources) increases, the amount of noise (e.g., spurious data, outlies, etc.) decreases and a data portfolio 225 can be projected to more accurately represent particular segment characteristics. As the sample size grows for a particular portfolio, aggregation module 440 may eliminate noise by recognizing inconsistent and unrelated characteristics within the larger number of IoT data channels. In some implementations, aggregation module 440 may identify a minimum threshold of data channels required to ensure an accurate representation of segment characteristics. A well-constructed data portfolio 225 will, thus, provide a good representation of underlying data sources with noise minimized.

Portfolio construction module 450 may generate data portfolios 225. For example, portfolio construction module 450 may apply normalized, aggregated, and/or linked data from normalization module 420, data linking module 430, aggregation module 440, and/or IoT data cache 410 to fields included in data set descriptors 405. In another implementation, data portfolios 225 may be constructed without explicit attribute choices. For example, a machine learning algorithm such as clustering may be used to construct a suitable portfolio.

Figure 6:
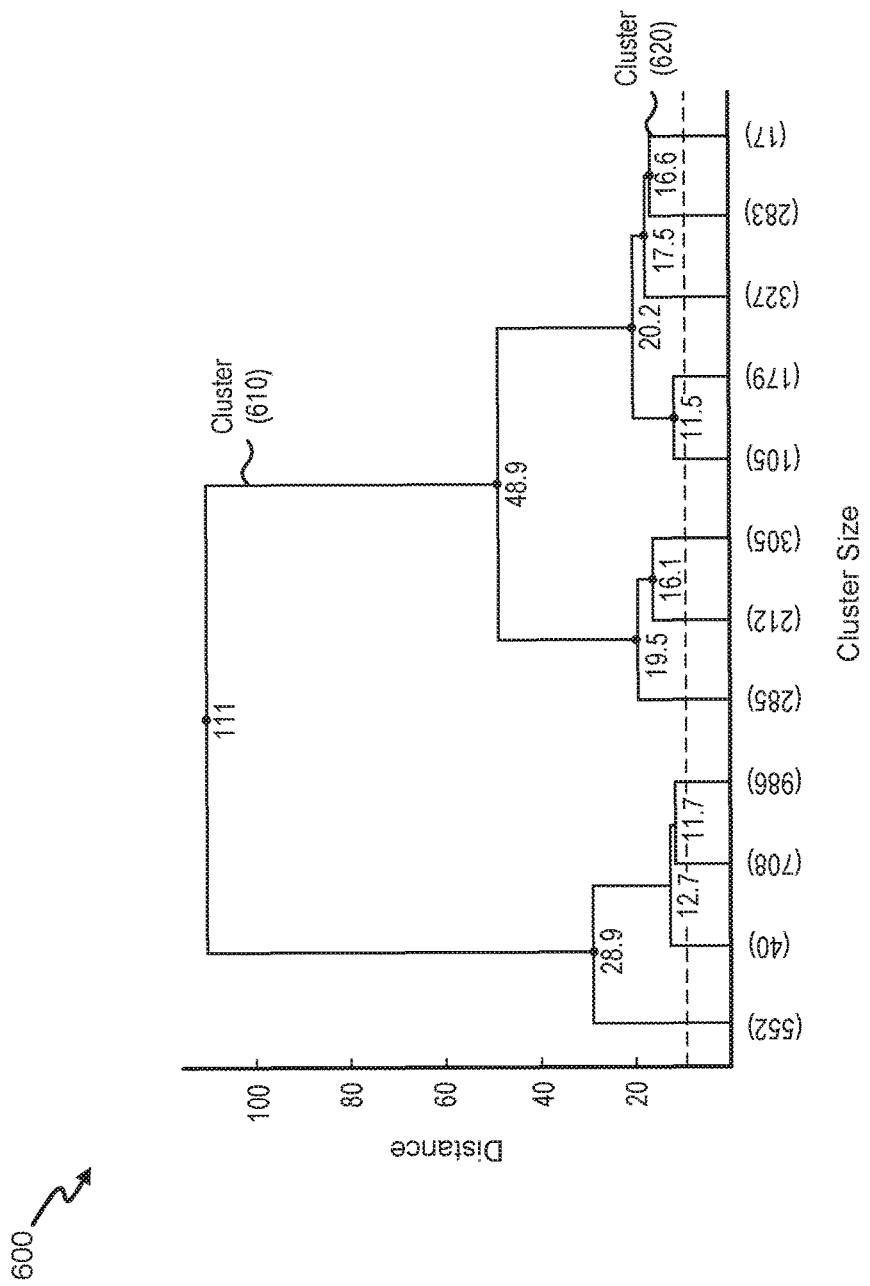
FIG. 6 is a sample graph illustrating clustering of IoT data for a data portfolio of FIG. 2B.

In one implementation, portfolio construction module 450 may use a cluster or a cluster of clusters to form a base to construct a portfolio 225. For example, FIG. 6 provides a graph 600 illustrating clustering of IoT data, and particularly for foot traffic data in a city. As illustrated in FIG. 6, data clustering in graph 600 represents a sample data set of foot traffic of a smart city trial. Different levels of clusters can be observed in FIG. 6, and can serve the needs of different potential customers. Each cluster may represent, for example, a distance walked by people in a particular neighborhood, block, area, etc., over a period of time. A city planner may be interested in overall traffic flow, while a pizza shop may be interested in a particular cluster that represents potential customers in one area. Thus, a data portfolio 225 suitable for the city planner, for example, could include the largest cluster (e.g., duster 610) of graph 600. In contrast, a data portfolio 225 suitable for the pizza shop, for example, might include a single smaller cluster of graph 600, such as cluster 620 directed to the area of the pizza shop.

Monitoring module 460 may monitor whether sufficient data is being collected to support a particular portfolio definition. In one implementation, when insufficient data is available to complete a portfolio 225 (e.g., with sufficient aggregation/anonymization) monitoring module 460 may provide feedback to data set descriptors 405 to increase consumer incentives for providing particular types of data needed for a data portfolio 225. Monitoring module 460 may track sales values and customer interest for each data portfolio 225. Monitoring module 460 may also collect feedback from buyers in the form of ratings or directed comments as to the effectiveness/accuracy of a particular data portfolio. For example, monitoring module 460 may provide a user interface for registered users (e.g., customers of data portfolios 225) to submit feedback for purchased data products.

Although FIG. 4 shows exemplary modules of data product generator 210, in other implementations, data product generator 210 may include fewer modules, different modules, or additional modules than those depicted in FIG. 4.

Figure 7:
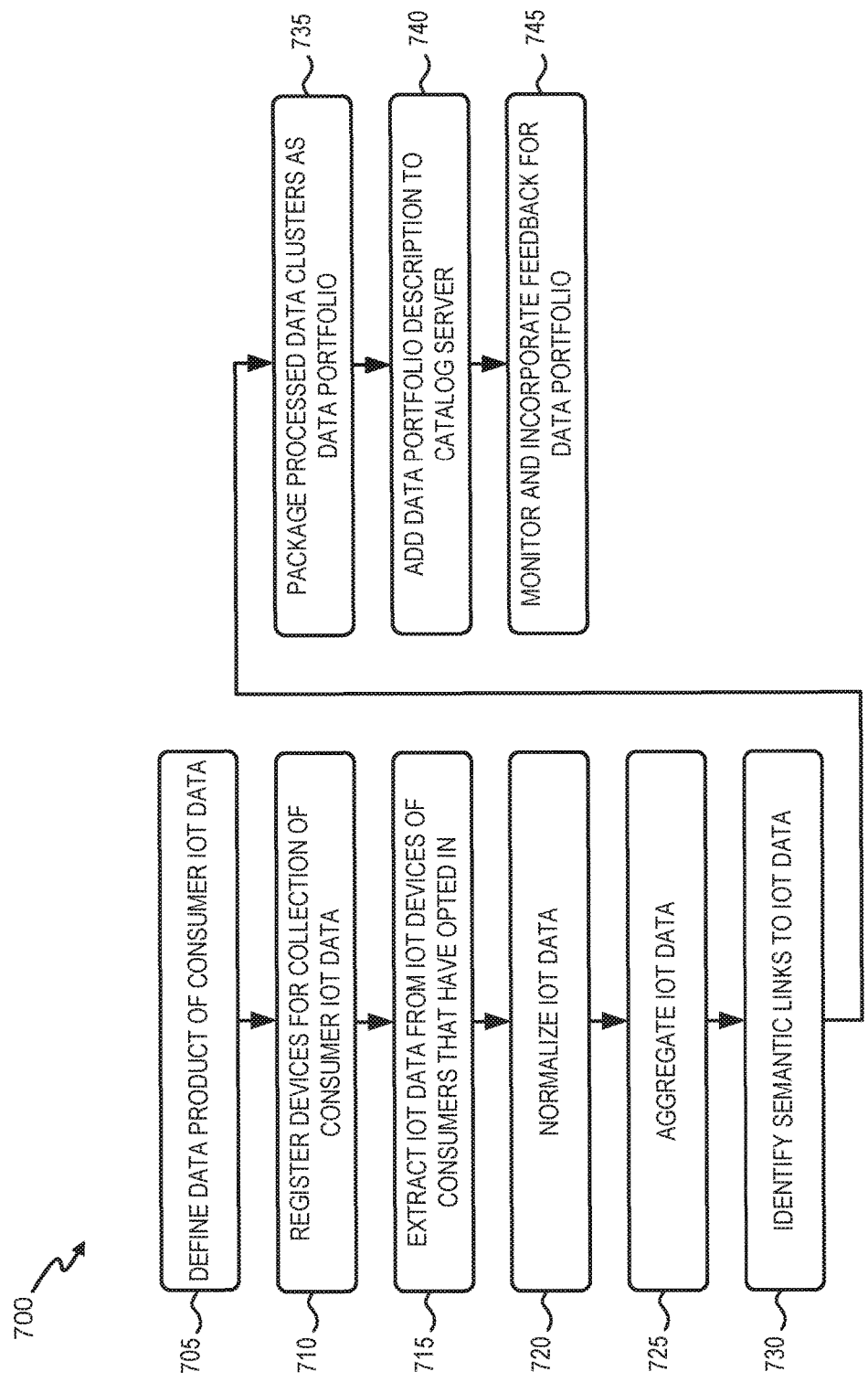
FIG. 7 is a flow diagram illustrating an exemplary process for providing an IoT data product, according to an implementation described herein.

FIG. 7 is a flow diagram illustrating an exemplary process 700 for providing an IoT data product. In one implementation, process 700 may be implemented by devices in IoT monetization platform 150. In another implementation, process 700 may be implemented by devices in IoT monetization platform 150 in conjunction with one or more other devices in network environment 100, such as one or more devices in communication network 130 or services network 120.

Process 700 may include defining a data product of consumer IoT data (block 705). For example, based on input from potential customers, data product generator 210 may generate data set descriptors 405 that define particular groupings of IoT data 212. In one implementation, data set descriptors 405 may be generated using an automated process based on potential customer input. In another implementation, potential customers (e.g., using end devices 150) may structure particular data products by selecting a combination of particular grouping of IoT data 212 that data service platform 122 makes available.

Process 700 may include registering IoT devices for collection of consumer IoT data (block 710) and extracting IoT data from devices of the consumers that have opted in (block 715). For example, a service provider may advertise incentives for consumers to provide IoT data for a particular device type, activity, or event. In one implementation, registrations may be accepted only for particular data types or particular IoT devices for which data products (e.g., portfolios 225) are planned. Upon completion of the registration, services network 120 may collect IoT data from registered IoT devices 140. For example, data inspector 202 may identify packets of IoT data that come from registered devices and store them as authorized data 206. Data product generator 210 may receive IoT data 212, from authorized data 206, for a particular portfolio description, and store a copy of the data as IoT data cache 410. Depending on the consumer's registration preferences, collection of data may occur, for example, while an IoT device 140 is in a particular geographic location, for a particular event duration, for period intervals, for only particular types of data, and/or without restrictions.

Process 700 may also include normalizing the received IoT data (block 720). For example, data product generator 210 (e.g., normalization module 420) may retrieve data from IoT data cache 410 and translate various data formats into a unified syntax. For example, data product generator 210 may translate particular unit values to a common measurement unit (e.g., English-to-metric, etc.), assign common names for data fields from different IoT device vendors, and conduct other changes to provide consistency among multiple data formats.

Process 700 may further include aggregating the IoT data into clusters (block 725) and identifying semantic links to the IoT data (block 730). For example, data product generator 210 (e.g., aggregation module 440) may retrieve data from IoT data cache 410 or normalization module 420 and group the data into clusters. For example, data from multiple sources (e.g., different IoT devices 140) with the same data fields may be disassociated from source indicators and grouped into clusters. Data product generator 210 (e.g., data linking module 430) may also apply data semantics to provide context for individual data items. For example, data linking module 430 may associate data with particular times of day, events, locations, types of sources (e.g., device types, platforms, etc.), and the like.

Process 700 may additionally include packaging the processed data clusters as a data portfolio (block 735), and adding a description of the data portfolio to a catalog server (block 740). For example, data product generator 210 (e.g., portfolio construction module 450) may match data set descriptors 405 with the normalized, aggregated, linked IoT data clusters to develop a particular data portfolio 225. In one implementation, portfolio construction module 450 may identify a minimum number of registered IoT devices 140 required to achieve data anonymity for a cluster (e.g., an anonymity threshold). In another implementation, portfolio construction module 450 may identify a minimum number of registered IoT devices 140 required to distinguish true cluster characteristics from noise (e.g., a noise-reduction threshold), which may be different than the anonymity threshold. Portfolio construction module 450 may delay constructing a data product until the amount of IoT data input reaches the anonymity threshold or both the anonymity and noise reduction thresholds. Portfolio construction module 450 may provide a description (e.g., data fields, data/time ranges, number of sources, etc.) of each data portfolio 225 to data product catalog server 220.

Process 700 may further include monitoring the data portfolio and incorporating feedback (block 745). For example, data product generator 210 (e.g., monitoring module 460) may monitor whether sufficient data is being collected to support a particular portfolio definition. In one implementation, when insufficient data is available to complete a portfolio 225 (e.g., with sufficient aggregation/anonymization), monitoring module 460 may provide feedback to data set descriptors 405 to increase consumer incentives for providing particular types of data needed for a data portfolio 225. Monitoring module 460 may also track sales values and customer interest for each data portfolio

225. In another implementation, monitoring module 460 may also collect feedback from customers in the form of ratings or directed comments as to the effectiveness/accuracy of a particular data portfolio.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 7, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device, a definition for a data product of consumer Internet-of-Things (IoT) data, where the definition identifies a particular data criteria of interest to buyers;
   registering, by the network device, multiple machine-type communications (MTC)-devices for collection of the consumer IoT data,
   wherein the multiple MTC devices provide the consumer IoT data with heterogeneous formats, and
   wherein the registering identifies a profile for each of the multiple MTC devices and particular data types authorized for collection from each of the multiple MTC devices;
   receiving, by the network device, consumer IoT data generated by the multiple MTC devices;
   extracting, by the network device and based on the profiles, the particular data types from the consumer IoT data;
   normalizing, by the network device, the extracted particular data types to include a uniform data format, wherein the normalizing produces normalized IoT data;
   aggregating, by the network device, the normalized IOT data into clusters, wherein the clusters include at least a portion of the normalized IoT data from multiple MTC devices and wherein the clusters exclude device identifiers for the multiple MTC devices;
   constructing, by the network device, the clusters into a data portfolio that meets the definition for the data product; and
   generating, by the network device, a description of the data portfolio.

2. The method of claim 1, further comprising:
   receiving feedback regarding the effectiveness of the data portfolio; and
   modifying the data portfolio based on the feedback.

3. The method of claim 1, further comprising:
   identifying, by the network device, semantic links to the clusters; and
   adding the sematic links to the data portfolio.

4. The method of claim 1, wherein the aggregating includes:
   identifying a first minimum number of multiple MTC devices, that provide IoT data, required to achieve data anonymity for a cluster, wherein the constructing is delayed until IoT data from the first minimum number of multiple MTC devices is received.

5. The method of claim 4, further comprising:
   identifying a second minimum number of multiple MTC devices, that provide IoT data, required to distinguish cluster characteristics from noise, wherein the constructing is delayed until IoT data from the first minimum number and the second minimum number of multiple MTC devices is received.

6. The method of claim 1, further comprising:
   associating, by the network device, the particular types of IoT data with the compensation value; and
   compensating, by the network device, the accounts associated with the multiple MTC devices after extracting the particular data types.

7. The method of claim 1, wherein the consumer IoT data with heterogeneous formats includes MTC communications from the multiple MTC devices with different original equipment manufacturers or different software platforms.

8. The method of claim 1, wherein the extracting includes:
   identifying, in the consumer IoT data, a unique device identifier of one of the multiple MTC devices;
   matching the unique device identifier to one of the profiles; and
   accepting the particular data types that are authorized in the one of the profiles.

9. The method of claim 8, wherein the accepting includes:
   identifying, in the consumer IoT data, an API identifier;
   comparing the API identifier to the one of the profiles; and accepting the particular data types when the API identifier corresponds to one of the particular data types in the one of the profiles.

10. The method of claim 1, further comprising:
associating, by the network device and using the profile, receipt of the particular data types with a compensation value for accounts associated with the multiple MTC devices;
identifying a minimum purchase value for the data portfolio, wherein the minimum purchase value is based in part on the compensation value; and
providing the description of the data portfolio to a catalog server.

11. One or more network devices, comprising:
a memory for storing instructions; and
one or more processors configured to execute the instructions to:
receive a definition for a data product of consumer Internet-of-Things (IoT) data, where the definition identifies a particular data criteria of interest to buyers;
register multiple machine-type communications (MTC) devices for collection of the consumer IoT data,
wherein the multiple MTC devices provide the consumer IoT data with heterogeneous formats, and
wherein the registering identifies a profile for each of the multiple MTC devices and particular data types authorized for collection from each of the multiple MTC devices;
receive consumer IoT data generated by the multiple MTC devices;
extract, based on the profiles, the particular data types from the consumer IoT data;
normalize the extracted particular data types to include a uniform data format, wherein the normalizing produces normalized IoT data;
aggregate the normalized IOT data into clusters, wherein the clusters include at least a portion of the normalized IoT data from multiple MTC devices and wherein the clusters exclude device identifiers for the multiple MTC devices;
construct the clusters into a data portfolio that meets the definition for the data product; and
generate a description of the data portfolio.

12. The one or more network devices of claim 11, wherein, when extracting the particular data types, the one or more processors are further configured to execute the instructions to:
identify, in the consumer IoT data, a unique device identifier of one of the multiple MTC devices;
match the unique device identifier to one of the profiles; and
accept the particular data types that are authorized in the one of the profiles.

13. The one or more network devices of claim 12, wherein, when accepting the particular data types, the one or more processors are further configured to execute the instructions to:
identify, in the consumer IoT data, an API identifier;
compare the API identifier to the one of the profiles; and
accept the particular data types when the API identifier corresponds to one of the particular data types in the one of the profiles.

14. The one or more network devices of claim 11, wherein the one or more processors are further configured to execute the instructions to:
receive feedback regarding the effectiveness of the data portfolio; and
modify the data portfolio based on the feedback.

15. The one or more network devices of claim 11, wherein the one or more processors are further configured to execute the instructions to:
identify semantic links to the clusters; and
add the sematic links to the data portfolio.

16. The one or more network devices of claim 11, wherein the one or more processors are further configured to execute the instructions to:
identify a first minimum number of multiple MTC devices, that provide IoT data, required to achieve data anonymity for a cluster; and
identify a second minimum number of multiple MTC devices, that provide IoT data, required to distinguish cluster characteristics from noise,
wherein the one or more processors does not construct the data portfolio until IoT data from the first minimum number and the second minimum number of the multiple MTC devices is received.

17. The one or more network devices of claim 11, wherein the one or more processors are further configured to execute the instructions to:
associate the particular types of IoT data with the compensation value; and
compensate the accounts associated with the multiple MTC device after extracting the particular data types.

18. The one or more network devices of claim 11, wherein the consumer IoT data with heterogeneous formats includes MTC communications from the multiple MTC devices with different original equipment manufacturers or different software platforms.

19. A non-transitory computer-readable medium containing instructions executable by at least one processor, the computer-readable medium comprising one or more instructions to cause the at least one processor to:
receive a definition for a data product of consumer Internet-of-Things (IoT) data, where the definition identifies a particular data criteria of interest to buyers;
register multiple machine-type communications (MTC)-devices for collection of the consumer IoT data,
wherein the multiple MTC devices provide the consumer IoT data with heterogeneous formats, and
wherein the registering identifies a profile for each of the multiple MTC devices and particular data types authorized for collection from each of the multiple MTC devices;
receive consumer IoT data generated by the multiple MTC devices;
extract, based on the profiles, the particular data types from the consumer IoT data;
normalize the extracted particular data types to include a uniform data format, wherein the normalizing produces normalized IoT data;
aggregate the normalized IOT data into clusters, wherein the clusters include at least a portion of the normalized IoT data from multiple MTC devices and wherein the clusters exclude device identifiers for the multiple MTC devices; and
construct the clusters into a data portfolio that meets the definition for the data product.

20. The non-transitory computer-readable medium claim 19, further comprising one or more instructions to cause the at least one processor to:
generate a description of the data portfolio; and send the description of the data portfolio to a catalog server.

\* \* \* \* \*